Patented Mar. 27, 1945

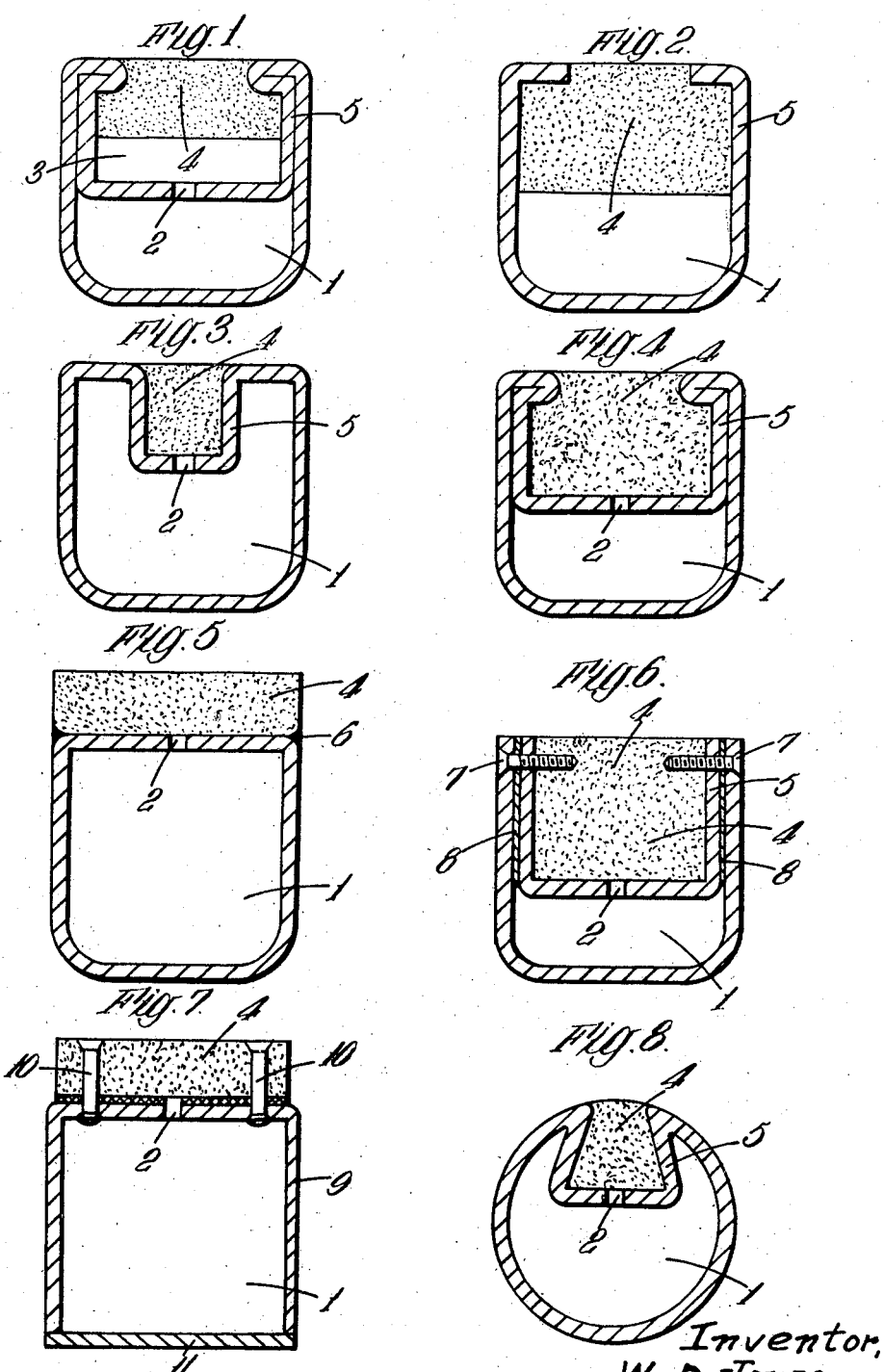

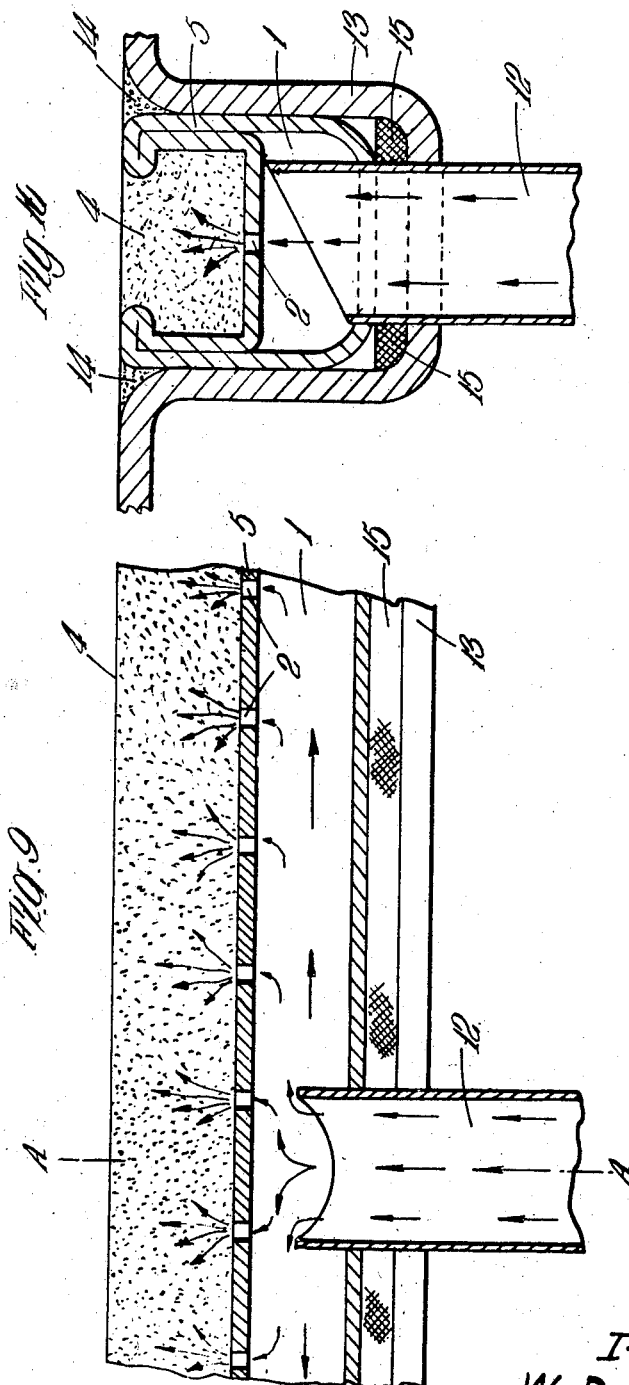

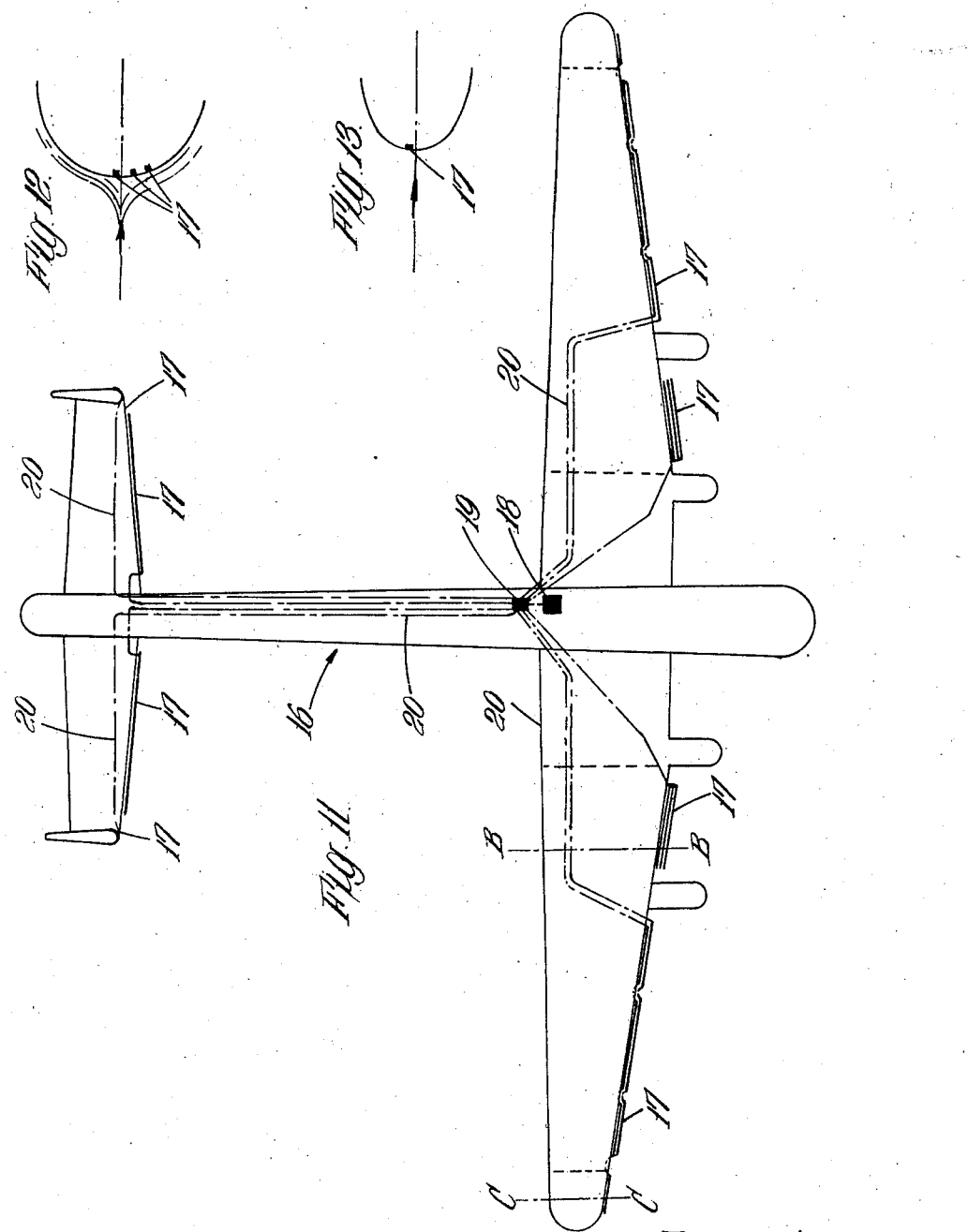

2,372,581

UNITED STATES PATENT OFFICE 2,372,581

PREVENTION OF ICE FORMATION ON AIRCRAFT

William David Jones, London, England, assignor to The Sheepbridge Stokes Centrifugal Castings Company Limited, Chesterfield, England Application November 17, 1942, Serial No. 465,887
In Great Britain February 18, 1942

2 Claims. (Cl. 244—134)

This invention relates to means for preventing the formation of ice on aircraft.

Various means have been proposed for the prevention of ice formation on aircraft, but none of these has been entirely satisfactory.

It is an object of the present invention to provide an improved means for preventing ice formation on aircraft, utilising an anti-freezing liquid such as ethylene glycol.

The means according to the present invention provide for the efficient distribution of the anti-freezing liquid over that part of the aircraft upon which it is desired to prevent the formation of ice.

A further object of the invention is to provide such means which will have considerable mechanical strength.

With these objects in view the present invention provides means for preventing the formation of ice on aircraft comprising a mass of porous metal and means for supplying an anti-freezing liquid thereto, said mass of porous metal being disposed adjacent that part of the aircraft which it is desired to protect from the formation of ice.

The porous metal mass may be employed in any convenient form, for example as strips, plates or studs, and the means for supplying the porous metal with anti-freezing liquid may be of any convenient kind, for example a conduit provided, if desired, with a manifold at the end adjacent the porous metal mass, for example along the back of the porous metal mass. It will be understood that pumps or the like may be provided to convey the liquid to the metal mass. The liquid may be stored in any convenient reservoir and if it is not desired to use a pump the liquid may be stored under pressure and released as desired to feed it to the mass of porous metal.

According to one embodiment of the invention the means for preventing the formation of ice on aircraft comprises a tube provided with two extensions which with part of the surface of the tube form a channel. A plurality of holes are provided in the wall of the tube to form connections between the interior of the tube and the said channel, which contains a mass of porous metal. Preferably a space is provided between the bottom of the mass of porous metal and the bottom of the channel. The anti-freezing liquid is supplied to the interior of the tube by any convenient means such as a pump, and seeps through the mass of porous metal which is disposed adjacent that part of the aircraft which it is desired to protect from ice formation.

According to another embodiment the mass of porous metal may be mounted directly on top of the tube as by soldering or brazing, a plurality of holes being provided in the tube in the wall on which the porous metal is mounted.

The porous metal must be securely attached and is preferably bonded to the tube or other conduit. This may be effected, for example, by soldering or brazing, riveting or screwing, or by forming the mass of porous metal on the tube or other conduit as by sintering in such a way that bonding takes place.

The mass of porous metal is conveniently made from a metal powder by the processes known in the art of powder metallurgy. In choosing a metal for the porous metal mass consideration should be given to the factors of resistance to atmospheric corrosion and corrosion by the anti-freezing liquid, and also the factors of mechanical strength and resistance to vibration.

The invention will now be further described by way of example with reference to the accompanying drawings, in which:

Figs. 1 to 8 are views partly in section of the conduit supplying the anti-freezing liquid and the mass of porous metal attached thereto;

Fig. 9 is a sectional view of an apparatus according to the invention;

Fig. 10 is a sectional view taken on the line A—A of Fig. 9;

Fig. 11 is a plan view showing the apparatus according to the invention fitted to an aircraft;

Fig. 12 is a section on the line B—B of Fig. 11 and

Fig. 13 is a section on the line C—C of Fig. 11.

Referring to Figs. 1 to 8 of the drawings, in the embodiment shown in Fig. 1 anti-freezing liquid is supplied from the tube 1 through a plurality of holes 2 to a reservoir 3 from which the liquid seeps through the mass of porous metal 4 which is bonded to the channel member 5.

In the embodiment shown in Fig. 2 a rolled channel section serves to form both the tube 1 and the channel member 5, the liquid seeping directly into the mass of porous metal 4 from the tube 1.

In the embodiment shown in Fig. 3 the tube 1 is provided with a channel-shaped depression 5 to which the porous metal 4 is bonded and the bottom of this channel member is drilled with a plurality of holes 2.

The embodiment shown in Fig. 4 is similar to that shown in Fig. 1. In this case, however, the reservoir 3 is omitted.

In the embodiment shown in Fig. 5 the tube 1 is of approximately square cross-section having a plurality of holes 2 drilled in the top wall thereof to which a strip of porous metal 4 is attached by solder 6.

In the embodiment shown in Fig. 6 the mass of porous metal 4 is bonded to a U-shaped channel member 5 having in its bottom wall a plurality of holes 2. The channel member 5 is disposed in another channel member forming the tube 1 and the two channel members are connected in a pressure-tight manner by means of the screws 7 and the rubber strips 8.

In the embodiment shown in Fig. 7 the strip of porous metal 4 is riveted on to a U-shaped channel member 9 by rivets 10. A back strip 11 is then attached to the channel member 9 to form the tube 1. Holes 2 are drilled as shown to allow the anti-freezing liquid to pass from the tube 1 to the mass of porous metal 4.

In the embodiment shown in Fig. 8 the tube 1 is of circular section and is provided with a channel member 5 to which the mass of porous metal is bonded. The bottom of the channel member 5 is provided with a plurality of holes 2 through which the anti-freezing liquid seeps into the mass of porous metal.

Referring now to Figs. 9 and 10 of the drawings, these show an apparatus according to the invention utilising a unit of the kind shown in Fig. 4. The anti-freezing liquid is supplied by a pump (not shown) through a tube 12, for example of 5/8" diameter to a tube 1 which communicates by a plurality of holes 2, for example of 3/32" diameter at 1/4" pitch, with a mass of porous metal 4 bonded to the channel member 5, the whole being securely housed in a channel member 13 by means of the jointing cement 14 and the packing 15.

Referring now to Figs. 11 to 13 of the drawings, these illustrate the apparatus of the invention fitted to an aircraft. At various leading edges of the aircraft indicated generally by the reference numeral 16 there are fitted a number of units 17 comprising a mass of porous metal, and means for supplying an anti-freezing liquid thereto such as those illustrated in Figs. 1 to 8 of the drawings. It will be seen that in some cases a plurality of such units are employed. The anti-freezing liquid is contained in a tank 18 and is distributed to the various units 17 by the pump 19 and the feed pipes 20.

It will be understood that the expression "metal" as used herein includes alloys, and among metals which are suitable for use as constituents of the porous metal mass are nickel, nickel-copper alloys, copper-nickel-tin alloys, copper-nickel-antimony alloys and stainless steel.

By varying the size of the pores and the degree of porosity it will be possible to vary the rate at which the anti-freezing liquid is supplied to the surface which it is desired to protect.

Thus the porous metal used should have a solid content of between 30 and 80%, i. e., between 70 and 20% of voids. The pores are of the continuous type and can be formed by the use of a volatile substance such as "Sterotex" (a vegetable shortening) or salicyclic acid or stearine, which form a gas or vapour during sintering. The powders and the volatile substance are mixed uniformly and when in place in the channel member during sintering, gas or vapour will be evolved and will flow upwards. Porosity can be varied by using different shapes and sizes of powder. A spherical copper powder made by one process gave an entirely different flow to an electrolytic copper powder made by another. By adjusting the shape and the limits of the size of the powders used it is possible to adjust the pressure necessary to give the flow required. It was found that by varying the porosity through the porous metal, by using a very coarse base over the holes 2, the pressure necessary to give the correct flow could be made much lower. It was also found that the greater the range of particle size the higher is the pressure required to give equal flow and vice-versa. Also the larger the particle size within a given range the lower is the pressure necessary. By using a larger grain size lower melting point powder in admixture with any given particle of higher melting point powder it was found that a smaller number of large pores could be obtained, for example by using copper and nickel powders of 400 mesh and tin powder of between 100 and 200 mesh.

In general the anti-freezing liquid will be supplied by pumping and a pump which works up to a pressure of 200 lbs./sq. in. is suitable, this being sufficient to give constant flow to 10 delivery outlets. The flow to any outlet can be adjusted as desired and will remain constant when once set. To ensure the correct distribution throughout the delivery system shown in Fig. 11 of the drawings, it is necessary to provide for a certain amount of pressure drop through the porous metal so as to give the necessary flow over the 10 to 15 feet lengths required. At ordinary day temperatures, for example 15° C., it is advisable to employ the lowest pressure which will give distribution, since with the lowering of the temperature to —40° C. the viscosity of the anti-freezing liquid is much higher and the liquid requires greater pressure to pump it over the system. With a pump pressure of 2 to 3 lbs./sq. in. at 15° C. it was found that a pressure of 100 to 125 lbs./sq. in. was necessary to give the same flow at —40° C. The normal practice will be to set the pump at the correct flow and allow it to continue to run.

The following examples illustrate how the conduits supplying the anti-freezing liquid and the mass of porous metal attached thereto, as illustrated in Figs. 1 to 8 of the drawings, may be prepared.

1. A Monel metal tube having a section as shown in Fig. 1 was provided with 3/32" diameter holes at 1/4" pitch along the base of the channel 5, the holes being those having the reference numeral 2. The tube was then cleaned by heating in hydrogen, the holes covered with a mixture of volatile gum and a nickel powder of between 100 and 200 mesh and allowed to dry. The channel was then filled to overflowing with a homogeneous mixture of equal parts by weight of nickel and copper powders, each finer than 400 mesh, and the top face levelled by means of a non-magnetic strip. The tube and its contents were then heated without vibration in a non-oxidizing atmosphere at 1120° C. for 15 minutes by passing it through a continuous type brazing furnace, whereby the powders sintered and were firmly bonded to the sides of the channel. The tube when tested at 15° C. with a suitable anti-freezing liquid gave a uniform flow of 1 1/3 pints per foot per hour at a pressure of 2 1/2 lbs./sq. in. When tested at —40° C., using the same liquid which was pumped to the tube the pump gave a pressure of 95 lbs./sq. in.

2. A Monel metal tube of the kind used in Example 1 was employed and the tube was subjected both inside and out to pickling. The holes were covered with a mixture of Gloy and coarse nickel powder. The channel was then filled with a homogeneous mixture of 90 parts by weight of copper, 10 parts by weight of tin and 1 part by weight of salicyclic acid, the copper being in the form of a powder of between 200 and 300 mesh and the tin being in the form of a powder finer than 400 mesh. The tube and its contents were then heated without vibration in a non-oxidizing atmosphere for 60 minutes at 810° C. by passing it through a continuous type brazing furnace, whereby the powders sintered and were firmly bonded to the sides of the channel. The tube was then tested in the same manner as described in Example 1 and gave satisfactory results at temperatures between 15° C. and −60° C.

3. A Monel metal tube having a section as shown in Fig. 1 was provided with $\frac{3}{32}$" diameter holes at 1½" pitch along the base of the channel 5, the holes being those having the reference numeral 2. The tube was then subjected to electrolytic etching and the channel was filled with a homogeneous mixture of 50 parts by weight of nickel, 45 parts by weight of copper, 5 parts by weight of tin and 1 part by weight of "Sterotex." The nickel and copper were in the form of powders finer than 400 mesh and the tin was in the form of a powder of between 200 and 300 mesh. Approximately 15% of the powder was removed by drawing along the channel a strip of synthetic resin shaped to level the powder, a strip of metal treated to prevent powders adhering thereto was placed along the top lips of the channel and fastened with spring clips. The tube was then placed in a jig which turned it to stand on the metal strip. A suitable vibration was then coupled to the side of the channel and the complete assembly vibrated. The tube, with the strip and fasteners, was then sintered in a hydrogen atmosphere at 1120° C. for 35 minutes, whereby the compact formed was firmly bonded to the sides of the channel. The apparatus was then tested as described in Example 1 and found to give satisfactory results at temperatures between 15° C. and −60° C.

4. A rolled channel of Monel metal as shown in Fig. 2 of the drawings, 10 feet long, was shot-blasted with nickel shot and then half filled with a mixture of 90 parts by weight of copper and 10 parts by weight of tin, the copper being in the form of a powder between 200 and 300 mesh and the tin being in the form of a powder finer than 400 mesh. The top face of the powder was made level and a strip of mild steel treated with graphite was fastened along the top face with steel clips. The channel was turned over and stood on the strip on the conveyor of a continuous type furnace. The assembly was then heated at 810° C. in a non-oxidizing atmosphere for 35 minutes, whereby the powders sintered and were firmly bonded to the sides of the channel. The apparatus was tested as described in Example 1 and was found to give satisfactory results at temperatures between 15° C. and −60° C.

5. A porous metal strip was made by sintering a mixture of equal parts by weight of copper and nickel powders both finer than 400 mesh in a stainless steel mould ½" wide, ¼" deep and 6 feet long. To prevent the powder bonding on to the mould a fine covering of graphite was used. The sintering was effected at 1100° C. for 35 minutes in an atmosphere of cracked ammonia, in a continuous type furnace. The strip was removed from the mould and fixed to a tube either in the manner shown in Fig. 5 or in the manner shown in Fig. 7.

I claim:

1. An aeronautical structural element disposed at the leading edge of an airfoil, said element having a surface exposed to icing conditions, a tube having two extensions forming a channel member, a rigid mass of porous metal bonded to the inner sides of said channel member, said tube having a plurality of holes therein, so disposed as to permit antifreezing liquid to flow from said tube to said mass, at least one of the faces of said mass being disposed in substantial continuity with said exposed surface of said element and another of its faces communicating with the inside of the channel.

2. An aeronautical structural element disposed at the leading edge of an airfoil, said element having a surface exposed to icing conditions, a tube having two extensions forming a channel member, a rigid mass of porous metal bonded to the inner sides of said channel member spaced apart from said channel member to form a reservoir, the bottom of said reservoir having a plurality of holes so disposed as to permit antifreezing liquid to flow from said tube to said reservoir, said mass being disposed with at least one of its faces in substantial continuity with said exposed surface of said element and another of its faces communicating with the inside of said reservoir.

WILLIAM DAVID JONES.